(12) United States Patent
Ito

(10) Patent No.: US 7,794,100 B2
(45) Date of Patent: Sep. 14, 2010

(54) PLANAR LIGHT SOURCE APPARATUS, DISPLAY APPARATUS AND PLANAR ILLUMINATION METHOD

(75) Inventor: Atsushi Ito, Kanagawa (JP)

(73) Assignee: Sony Corporation (JP)

( * ) Notice: Subject to any disclaimer, the term of this patent is extended or adjusted under 35 U.S.C. 154(b) by 356 days.

(21) Appl. No.: 12/005,247

(22) Filed: Dec. 26, 2007

(65) Prior Publication Data

US 2008/0158880 A1 Jul. 3, 2008

(30) Foreign Application Priority Data

Dec. 27, 2006 (JP) ............................ P2006-352605

(51) Int. Cl.
*G09F 13/08* (2006.01)
(52) U.S. Cl. ..................... 362/97.4; 362/244
(58) Field of Classification Search ................. 362/243, 362/244, 245, 97.4
See application file for complete search history.

(56) References Cited

U.S. PATENT DOCUMENTS

| | | | |
|---|---|---|---|
| 5,396,350 A | 3/1995 | Beeson et al. | |
| 5,521,725 A | 5/1996 | Beeson et al. | |
| 5,598,281 A | 1/1997 | Zimmerman et al. | |
| 5,748,828 A | 5/1998 | Steiner et al. | |
| 6,425,675 B2 | 7/2002 | Onishi et al. | |
| 2003/0184993 A1* | 10/2003 | Yamada ........................ | 362/31 |
| 2006/0237128 A1 | 10/2006 | Watanabe et al. | |

FOREIGN PATENT DOCUMENTS

| | | |
|---|---|---|
| JP | 2-93147 U | 7/1990 |
| JP | 8-511129 A | 5/1995 |
| JP | 10-500528 A | 11/1995 |
| JP | 8-221013 A | 8/1996 |
| JP | 9-505412 A | 5/1997 |
| JP | 10-507306 A | 7/1998 |
| JP | 10-511803 A | 11/1998 |
| JP | 2000-066030 A | 3/2000 |
| JP | 2000-503456 A | 3/2000 |
| JP | 2000-148036 A | 5/2000 |
| JP | 2000-173331 A | 6/2000 |
| JP | 2000-249836 A | 9/2000 |
| JP | 2000-258635 A | 9/2000 |
| JP | 2001-076521 A | 3/2001 |

(Continued)

OTHER PUBLICATIONS

Japanese Office Action issued on Nov. 18, 2008 in connection with corresponding Japanese Appln. No. 2006-352605.

*Primary Examiner*—John A Ward
(74) *Attorney, Agent, or Firm*—Lerner, David, Littenberg, Krumholz & Mentlik, LLP

(57) ABSTRACT

There is provided a planar light source apparatus, including: a light source configured to emit light in a spot-like pattern or a bar-like pattern; a reflective plate configured to reflect the light from said light source; a light guide plate disposed on the opposite side to said reflective plate with respect to the light source; and a lens array sheet disposed between the light source and the light guide plate; the lens array sheet having a plurality of convex-shaped lenses disposed in a predetermined state on a face thereof adjacent the light guide plate.

12 Claims, 12 Drawing Sheets

FOREIGN PATENT DOCUMENTS

| | | |
|---|---|---|
| JP | 2001-290062 A | 10/2001 |
| JP | 2001-307524 A | 11/2001 |
| JP | 2001-312913 A | 11/2001 |
| JP | 2001-312914 A | 11/2001 |
| JP | 2001-312915 A | 11/2001 |
| JP | 2001-325820 A | 11/2001 |
| JP | 2001-338507 A | 12/2001 |
| JP | 2001-345010 A | 12/2001 |
| JP | 2001-356704 A | 12/2001 |
| JP | 2001-357709 A | 12/2001 |
| JP | 2002-042528 A | 2/2002 |
| JP | 2002-133906 A | 5/2002 |
| JP | 2004-152719 A | 5/2004 |
| JP | 2004-212937 A | 7/2004 |
| JP | 2004-273238 A | 9/2004 |
| JP | 2005-005078 A | 1/2005 |
| JP | 2005-038746 A | 2/2005 |
| JP | 2005-050789 A | 2/2005 |
| JP | 2006-078737 A | 3/2006 |
| JP | 2006-164588 A | 6/2006 |
| JP | 2006-344409 A | 12/2006 |
| WO | WO-95/12782 | 5/1995 |
| WO | WO-95/31672 | 11/1995 |
| WO | WO-96/11358 | 4/1996 |

* cited by examiner

PLANAR LIGHT SOURCE APPARATUS, DISPLAY APPARATUS AND PLANAR ILLUMINATION METHOD

CROSS-REFERENCES CROSS-REFERENCE TO RELATED APPLICATIONS

The present application claims priority from Japanese Patent Application No. JP 2006-352605, filed in the Japanese Patent Office on Dec. 27, 2006, the entire content of which is incorporated herein by reference.

BACKGROUND OF THE INVENTION

1. Field of the Invention

This invention relates to a planar light source apparatus suitable for use for illuminating, for example, a liquid crystal display panel, a display apparatus which incorporates a planar light source apparatus, and a planar illumination method applied to a planar light source apparatus.

2. Description of the Related Art

A planar light source apparatus for use as a backlight for a liquid crystal panel which is used in a television receiver or a like apparatus which includes a screen of a comparatively large size typically has such a configuration as shown in FIGS. 20 and 21. It is to be noted that FIG. 21 is a sectional view taken along line II-II of FIG. 20. Referring to FIGS. 20 and 21, the planar light source apparatus shown is of the type called direct type wherein it is disposed directly on the rear face of a display panel. In particular, a plurality of lamps 11 are disposed uniformly in a case formed from a reflective plate 10. The front face of the reflective plate 10 is painted in white so that light from the lamps 11 is reflected efficiently. For the lamps 11, for example, a CCFL tube (Cold Cathode Fluorescent Lamp) is used.

A diffusion plate 20 is disposed on the reflective plate 10 on which the lamps 11 are disposed such that light incident directly to the rear face of the diffusion plate 20 from the lamps 11 side, or light reflected by the reflective plate 10 and incident to the diffusion plate 20, is radiated from the front face of the diffusion plate 20. The rear face of the liquid crystal display panel is illuminated with the light radiated from the surface of the diffusion plate 20. The diffusion plate 20 is formed by mixing light dispersing material in a transparent resin plate or by adhering a sheet having a light diffusing action to the front face of the diffusion plate 20 so that the brightness on the front face of the diffusion plate 20 may be uniformized. To control the light emitting state of a planar light source apparatus so as to obtain uniform brightness is very significant in order to uniformize the luminance of the display screen.

An example of a backlight apparatus of the type described is disclosed in Japanese Patent Laid-Open No. Hei 8-221013.

SUMMARY OF THE INVENTION

Incidentally, it is generally demanded to reduce the thickness of an entire liquid crystal display panel. Therefore, it is desirable to form also a direct type planar light source apparatus having the configuration described above with reference to FIG. 20 with a reduced thickness. In order to reduce the thickness of the direct type planar light source apparatus of the configuration shown in FIG. 20, the diffusion plate 20 is disposed closer to the lamps 11.

However, where the planar light source apparatus is configured such that the diffusion plate 20 is disposed closer to the lamps 11, it becomes difficult to sufficiently diffuse light only by means of the diffusion plate 20. This gives rise to a problem that the position just above each lamp 11 becomes brighter and the uniformity in luminance within the light emitting plane is damaged. As a countermeasure against this problem, measures for reducing the light immediately above the lamps using a light reflecting member only at the position of the diffusion plate just above each lamp are sometimes taken. However, this gives rise to another problem that the luminance of the overall area drops, and therefore, such measures as described above are not adopted frequently.

Therefore, it is desirable to provide a planar light source apparatus, a display apparatus and a planar illumination method wherein both of reduction in thickness and uniformization of the light emission luminance can be achieved.

According to an embodiment of the present invention, there is provided a planar light source apparatus including a light source configured to emit light in a spot-like pattern or a bar-like pattern, a reflective plate configured to reflect the light from the light source, a light guide plate disposed on the opposite side to the reflective plate with respect to the light source, and a lens array sheet disposed between the light source and the light guide plate, the lens array sheet having a plurality of convex-shaped lenses disposed in a predetermined state on a face thereof adjacent the light guide plate.

In the planar light source apparatus, light from the light source is diffused by an action of the convex-shaped lenses of the lens array sheet and the light guide plate disposed on the lens array sheet. Consequently, the light from the light source can be diffused and radiated favorably from the light guide plate. Accordingly, even if the distance from the reflective plate in which the light source is accommodated to the light guide plate is reduced, a light diffusion characteristic similar to that obtained by existing planar light source apparatus can be obtained. Consequently, reduction in thickness of the light source apparatus and reduction in thickness of a display apparatus in which the light source apparatus is built can be anticipated.

The above and other features and advantages of the present invention will become apparent from the following description and the appended claims, taken in conjunction with the accompanying drawings in which like parts or elements denoted by like reference characters.

DETAILED DESCRIPTION

Figure 1:
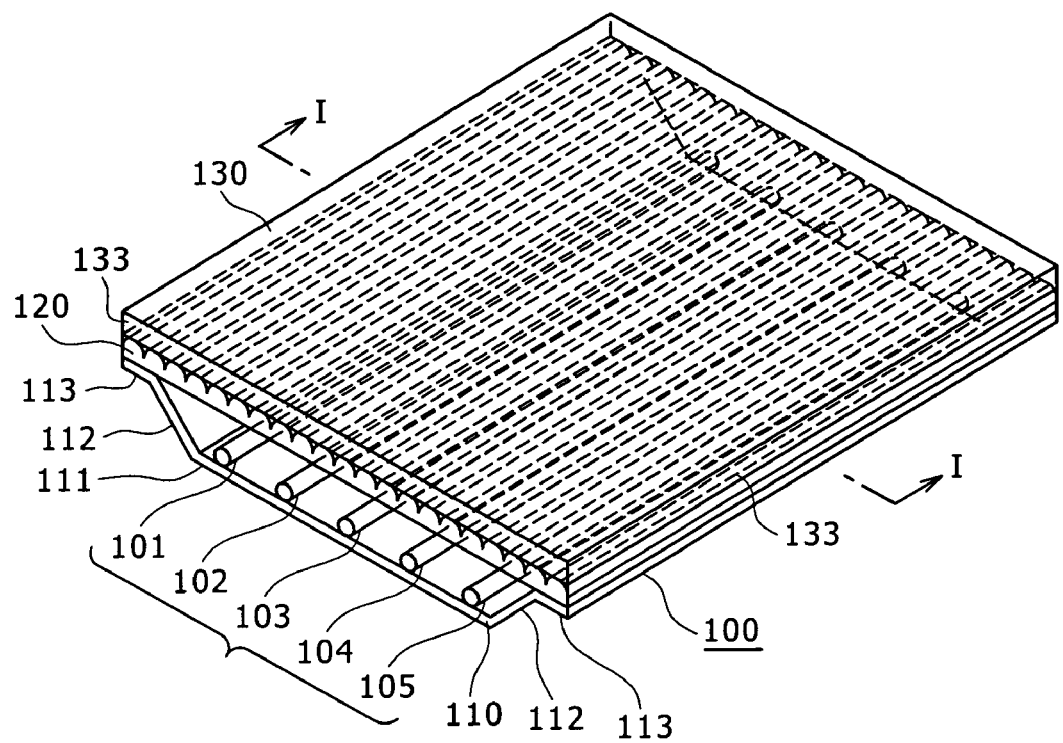
FIG. 1 is a perspective view showing an example of a general configuration of a planar light source apparatus to which the present invention is applied.
Figure 2:
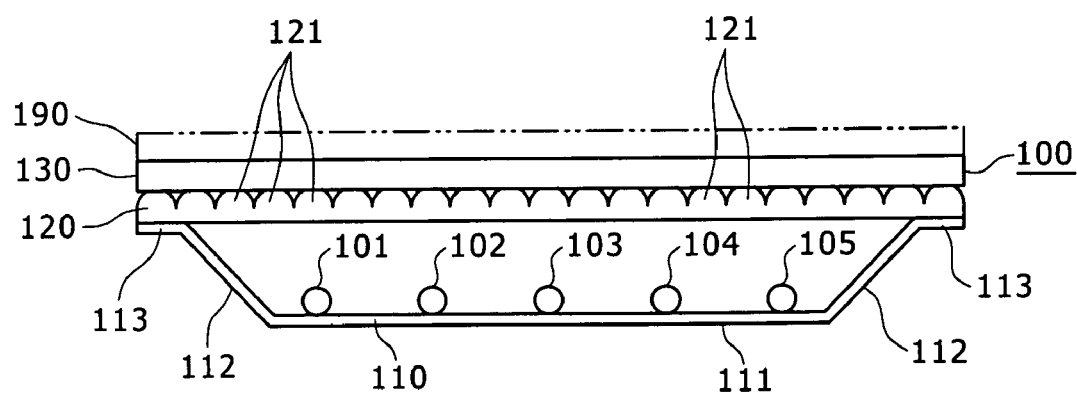
FIG. 2 is a sectional view taken along line I-I of FIG. 1.

Referring first to FIGS. 1 and 2, there is shown a planar light source apparatus 100 to which an embodiment of the present invention is applied. The planar light source apparatus 100 includes a reflective plate 110 disposed on the bottom thereof, and a plurality of, five in the arrangement shown, bar-shaped lamps 101, 102, 103, 104 and 105 disposed in parallel on a flat face 111 of the reflective plate 110. It is to be noted here that, while, in the arrangement shown, a CCFL tube (cold cathode fluorescent lamp) is used for the lamps 101 to 105, the lamp to be used for the lamps 101 to 105 is not limited to a CCFL tube but may be, for example, a hot cathode tube.

The inner face of the reflective plate 110 is painted in white so that light from the lamps 101 to 105 can be reflected efficiently. The reflective plate 110 has a pair of inclined portions 112 at opposite end portions thereof such that upper end portions 113 of the inclined portions 112 contact with a lens array sheet 120. It is to be noted that, although the opposite end portions of the reflective plate 110 in the longitudinal direction of the lamps 101 to 105 are shown open in FIG. 1 and so forth so that an internal configuration can be observed, actually they are covered with some members. The reflective plate 110 may be formed, for example, from foamed polyethylene terephthalate.

The lens array sheet 120 disposed above the reflective plate 110 has a flat face 124 (rear face; refer to FIG. 3) adjacent the reflective plate 110 (on the lower side in FIG. 1) and has a plurality of lens projections 121, which each serves as a convex lens, disposed on the front face thereof. Further, a light guide plate 130 is disposed on a front face of the lens array sheet 120. The light guide plate 130 is formed from a transparent member having a uniform thickness and having flat front and rear faces. In FIG. 2, a display panel 190 disposed on the front face of the light guide plate 130 is indicated by an imaginary line. The rear face of the display panel 190 is illuminated with light from the front face of the light guide plate 130 in this manner thereby to perform a process of illuminating an image displayed on the display panel 190. The display panel 190 may be formed, for example, from a liquid crystal display panel.

The lens array sheet 120 and the light guide plate 130 may be formed from a transparent material, and any material may be used if it is transparent in the range of visible radiation such as, for example, polycarbonate, glass and acrylic resin.

Figure 3:
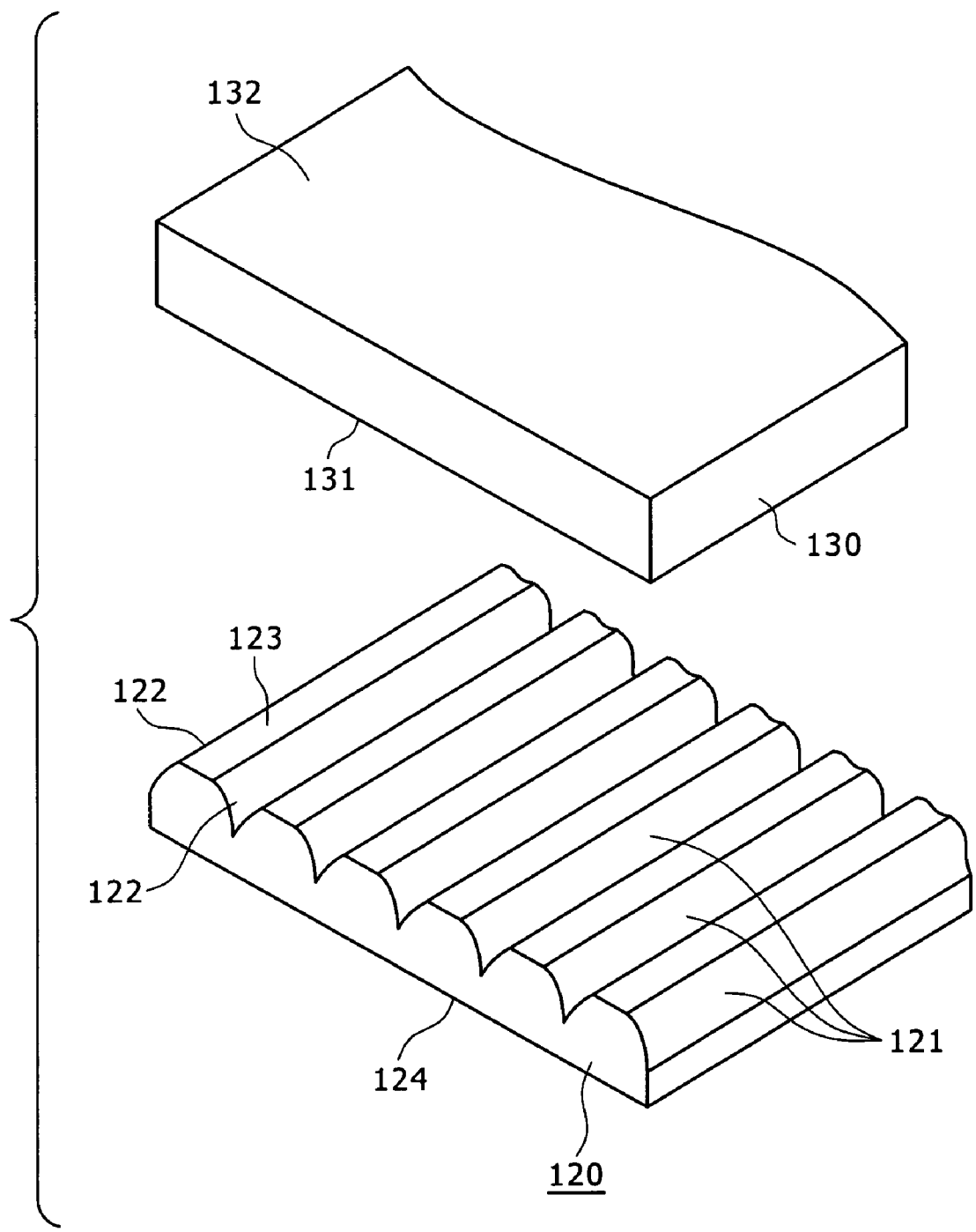
FIG. 3 is an enlarged exploded perspective view of part of the planar light source apparatus.

FIG. 3 is an enlarged exploded view of part of the lens array sheet 120 and the light guide plate 130. Referring to FIG. 3, each of the lens projections 121 disposed on the lens array sheet 120 is formed as a linear rib having a convex cross section such as a substantially triangular cross section. The lens projections 121 are disposed continuously such that they extend in parallel to each other.

Each of the lens projections 121 has curved face portions 122 on the opposite sides thereof and has a flat face portion 123 at an upper portion thereof between the curved face portions 122. The curved face portions 122 have a parabolic curved face such that light reflected from the parabolic curved faces thereof is focused at a focal position F (FIG. 4) in the proximity of the flat face portion 123. It is to be noted, however, that the shape of the cross section of the curved face portions 122 need not have a completely parabolic shape but can have various other shapes such as a curved shape similar to a parabola, a curved shape represented by a hyperbola, a mere elliptic shape and a shape of a combination of a straight line and a curved line. Where a parabolic curved face is applied, the focal position of light therefrom is defined. However, depending upon the shape, no focal point may be provided.

The flat face portions 123 of the lens projections 121 of the lens array sheet 120 optically closely contact with the rear face of the light guide plate 130. Although the lens array sheet 120 and the light guide plate 130 may be held in close contact with each other by any means, for example, a transparent adhesive or an ultraviolet curing resin material may be used. However, whatever means is applied, it is significant that the lens array sheet 120 and the light guide plate 130 optically closely contact with each other.

Figure 4:
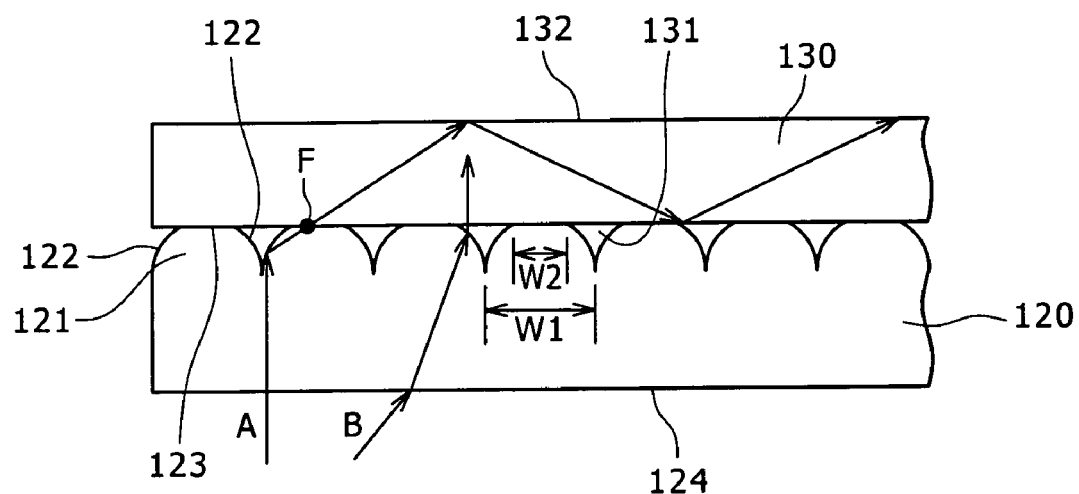
FIG. 4 is a schematic view generally showing a path of light through the planar light source apparatus.

Referring to FIG. 4, where the arranged distance (pitch) of the lens projections 121 is represented by W1 and the width of the flat face portion 123 at the upper portion of the lens projections 121 by W2, the distance W1 is set, for example, to approximately 0.2 to 0.3 mm while the width W2 is set, for example, to approximately 0.005 to 0.02 mm. The lens projections 121 of the lens array sheet 120 shown in the drawings are shown with a size greater than that given above for clarified illustration. It is to be noted that the arranged distance of the lamps 101 to 105 is, for example, approximately 20 to 30 mm. Preferably, the focal position F (FIG. 4) formed by the parabolic curved face portions 122 is within a distance of the [distance W1×0.1] from the flat face portion 123. The rear face 124 of the lens array sheet 120 remote from the upper face on which the lens projections 121 are disposed is flattened.

Now, an outline of a path of light incoming from the rear face (lower face) side of the lens array sheet 120 configured in such a manner as described above is described with reference to FIG. 4. Light A emitted from any lamp and incoming orthogonally to the lens array sheet 120 comes at a high ratio to the lens surface of the lens array. Thereupon, reflection of the light arises from a difference in refractive index between the air and the material of the lens array. The reflected light of the light A passes the focal position F of the lens projection 121 and comes to an upper face 132 of the light guide plate 130. Here, if the angle of the light is set suitably, then the light is totally reflected by the upper face 132 of the light guide plate 130. The light reflected by the upper face 132 of the light guide plate 130 is totally reflected also by a lower face 131 because the upper face 132 and the lower face 131 of the light guide plate 130 extend in parallel to each other. As a result, the light propagates in the light guide plate 130. The light propagating in the light guide plate 130 is radiated to the outside of the light guide plate 130 at a position at which the total reflection condition is lost by an optical mutual action of the light with the adhesion plane of the lens array sheet 120, the light guide plate 130 and the lens array surface and so forth. Where the radiated light to the outside of the light guide plate 130 goes out from the upper face 132 of the light guide plate 130, it makes illuminating light for illuminating the display panel. However, some light goes out from the lower face 131 of the light guide plate 130. The light going out from the lower face 131 of the light guide plate 130 is radiated to the reflective plate 110 side through the lens array sheet 120 and reflected by the reflective plate 110 so that it is introduced into the lens array sheet 120. Consequently, all light finally goes out from the upper face 132 of the light guide plate 130.

It is to be noted that light is reflected by the upper face 132 and the lower face 131 of the light guide plate 130 where the incident angle of light to the upper face 132 or the lower face 131 is equal to or smaller than some particular angle (for example, equal to or smaller than 43°). However, where the angle is greater than the particular angle but equal to or smaller than 90°, the light goes out as it is without being reflected. The particular angle for reflection depends upon the material of the light guide plate 130. Meanwhile, end faces 133 (FIG. 1) of the light guide plate 130 are processed so that incident light is reflected as it is irrespective of the incident angle so that radiation of light from the end faces 133 to the outside may be prevented.

Since the lens array sheet 120 acts in such a manner as described above, according to the configuration of the present embodiment, part of light emitted directly upwardly from the lamps is propagated in the light guide plate 130 such that it can be radiated from different positions of the light guide plate 130. The average distance of light in the light guide plate 130 and the ratio of light which makes a guided light component from within light incoming perpendicularly to the light guide plate 130 depend upon the size of pertaining portions of the planar light source apparatus 100 and the lamp arrangement. Therefore, the particular shape of the lens projections 121, the adhesion area between the flat face portions 123 of the lens projection 121 and the light guide plate 130 and so forth are examined suitably.

On the other hand, if light B emitted obliquely from the lamps comes to the surface of a lens projection 121 of the lens array sheet 120, then it is deflected to various directions depending upon the incident angle, the position of the lens and so forth. As a result, the light guide plate 130 functions so as to diffuse light emitted obliquely from the lamps.

Examples of a simulation of a state wherein light is introduced at various angles to an adhered block of the lens array sheet 120 and the light guide plate 130 are shown in FIGS. 5 to 12. It is to be noted that the angles shown in FIGS. 5 to 12 are represented as angular differences from the angle of 0° defined by light incident perpendicularly to the lens array sheet 120 which is in the form of a flat plate. Further, incident light (L0, L10, L20 and L45 hereinafter described) illustrated in the figures is light incident with a width of the pitch of one lens projection 121.

Figure 5:
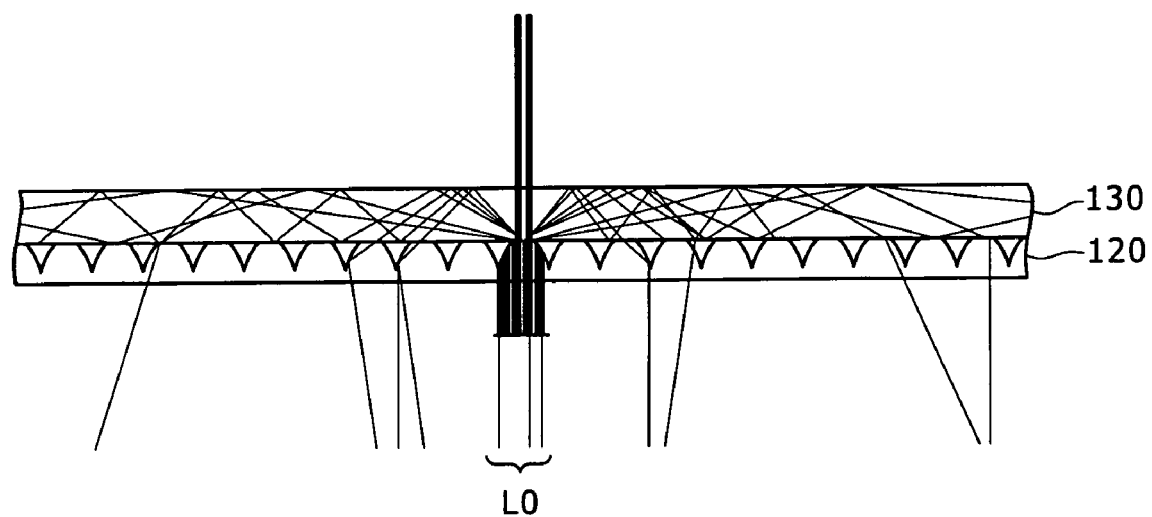
FIG. 5 is a schematic view showing an example of a path of light incident at an angle of 0° to a lens array sheet in the planar light source apparatus.
Figure 6:
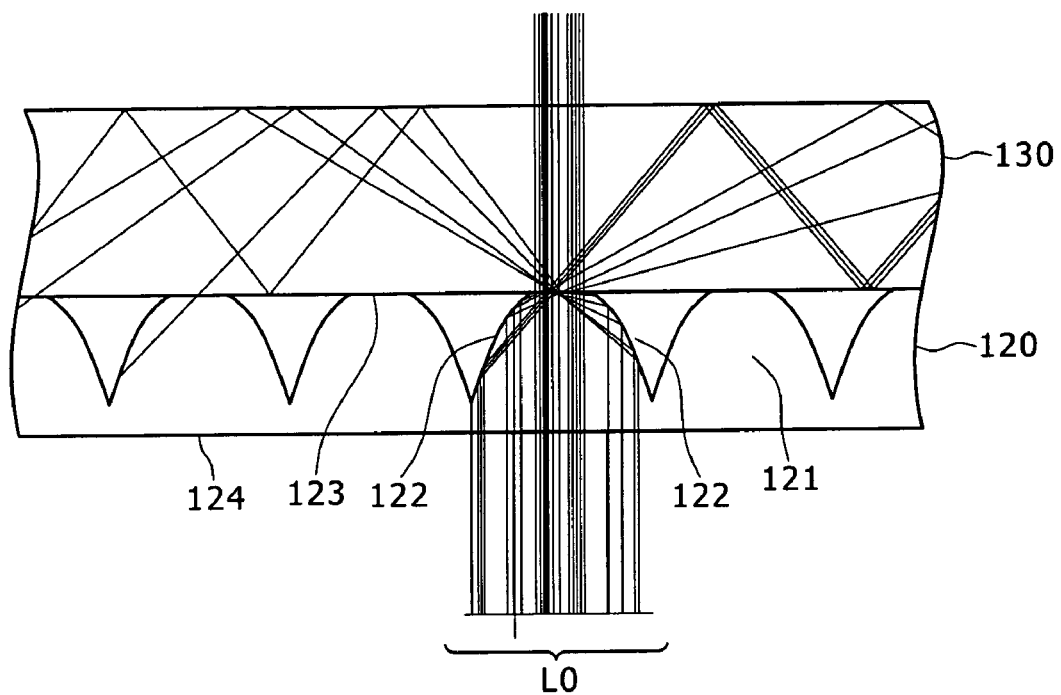
FIG. 6 is a schematic view showing part of FIG. 5 in an enlarged scale.

FIG. 5 illustrates a reflection state of light L0 incident at the angle of 0° to the lens array sheet 120. FIG. 6 shows a central portion of FIG. 5 in an enlarged scale. As recognized from FIGS. 5 and 6, light advancing straightforwardly to the flat face portion 123 of a lens projection 121 advances straightforwardly as it is in the light guide plate 130 and goes out from the upper face 132 of the light guide plate 130. Meanwhile, part of the light coming to the curved face portions 122 of the lens projection 121 is reflected by the curved face portions 122 and enters the light guide plate 130 past the focal position (or the proximity of the focal position).

Figure 7:
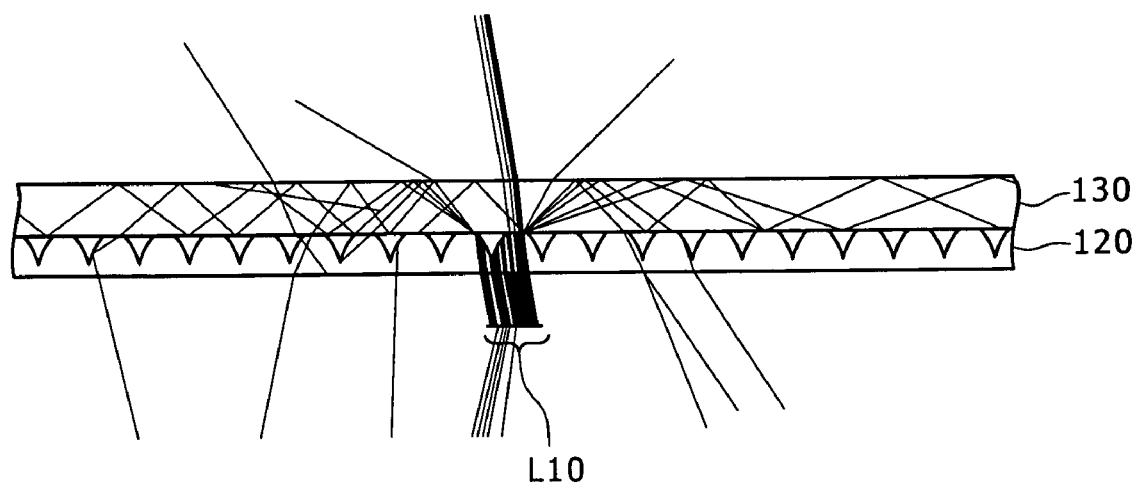
FIG. 7 is a schematic view showing an example of a path of light incident at another angle of 10° to the lens array sheet in the planar light source apparatus.
Figure 8:
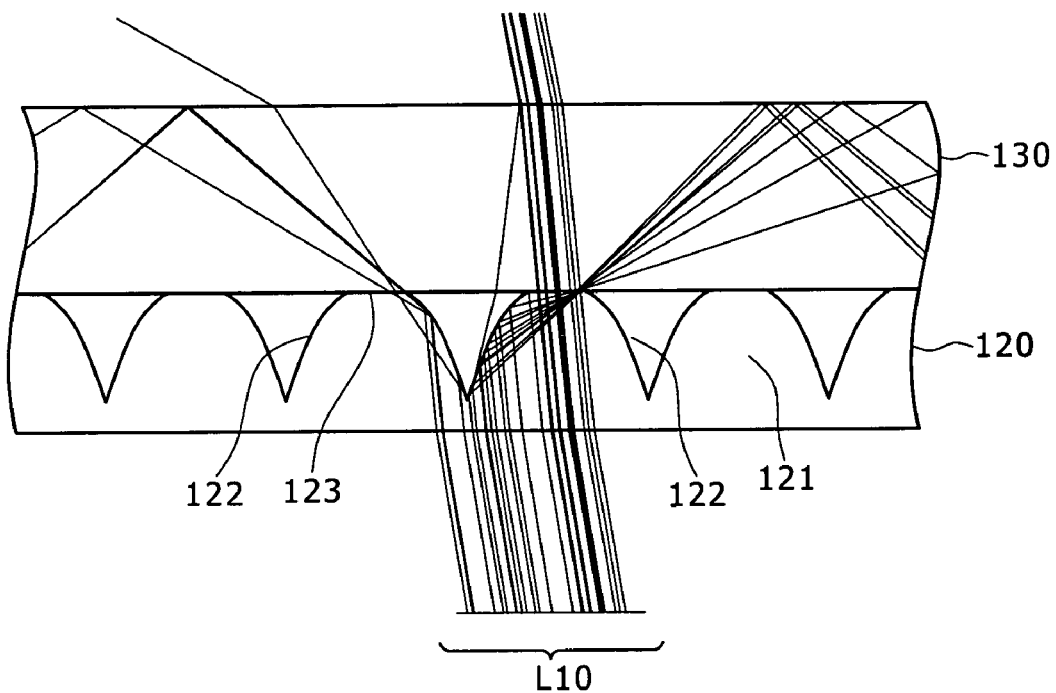
FIG. 8 is a schematic view showing part of FIG. 7 in an enlarged scale.
Figure 9:
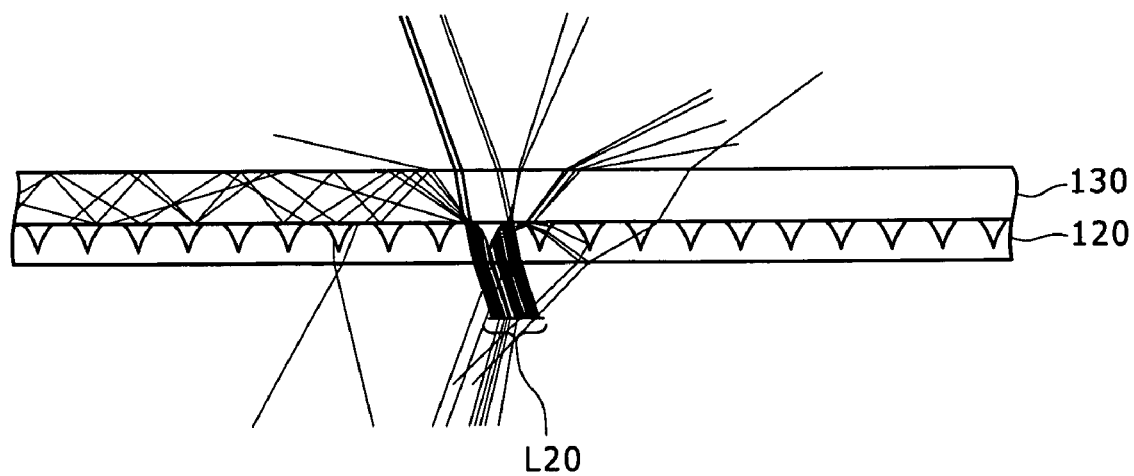
FIG. 9 is a schematic view showing an example of a path of light incident at a further angle of 20° to the lens array sheet in the planar light source apparatus.
Figure 10:
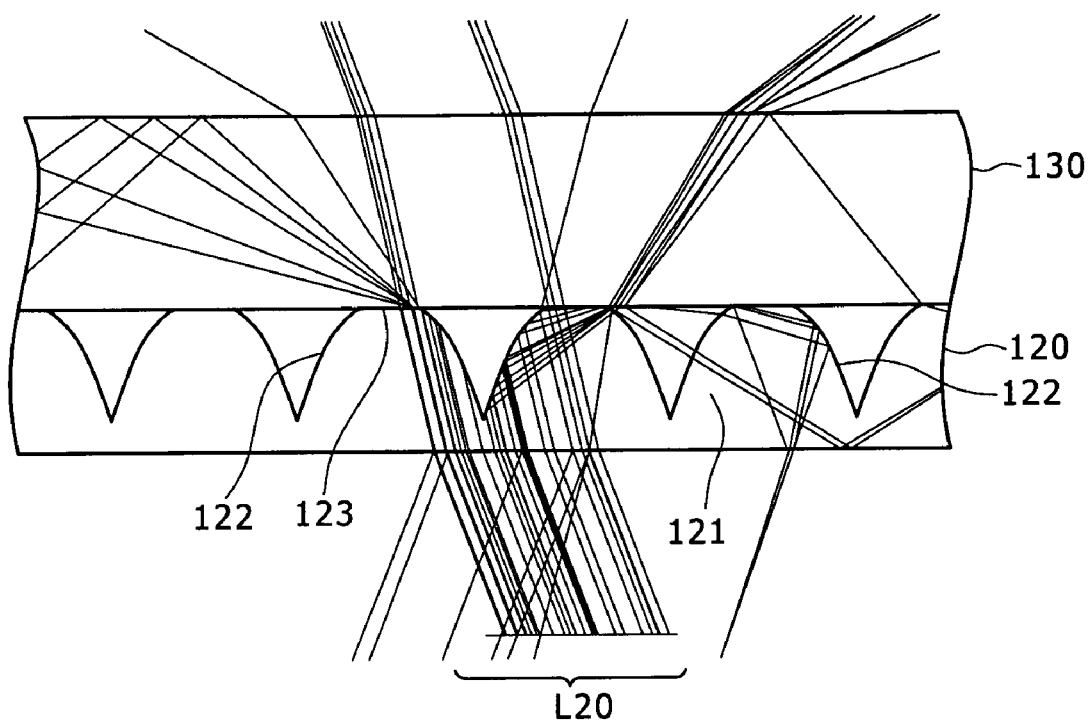
FIG. 10 is a schematic view showing part of FIG. 9 in an enlarged scale.
Figure 11:
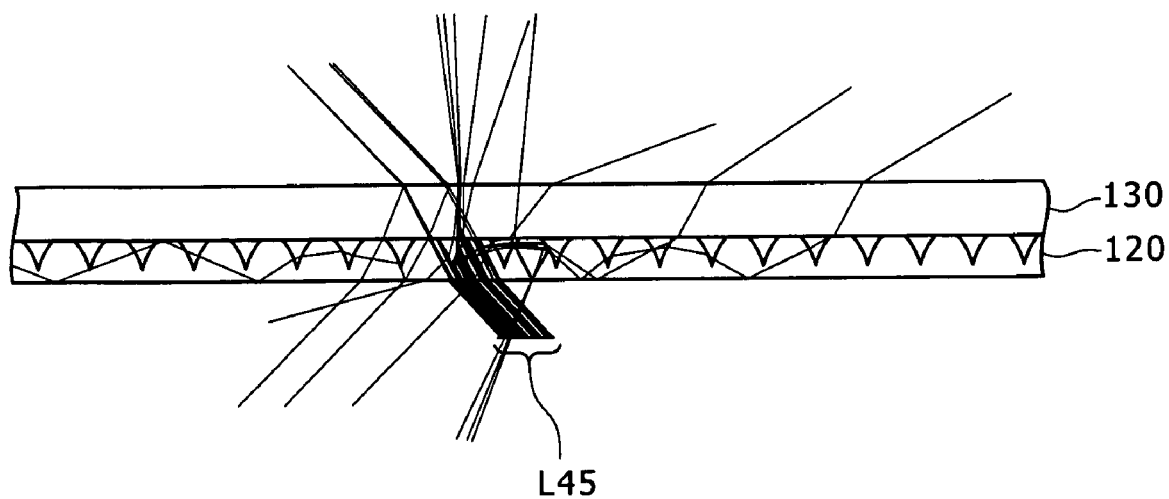
FIG. 11 is a schematic view showing an example of a path of light incident at a still further angle of 45° to the lens array sheet in the planar light source apparatus.
Figure 12:
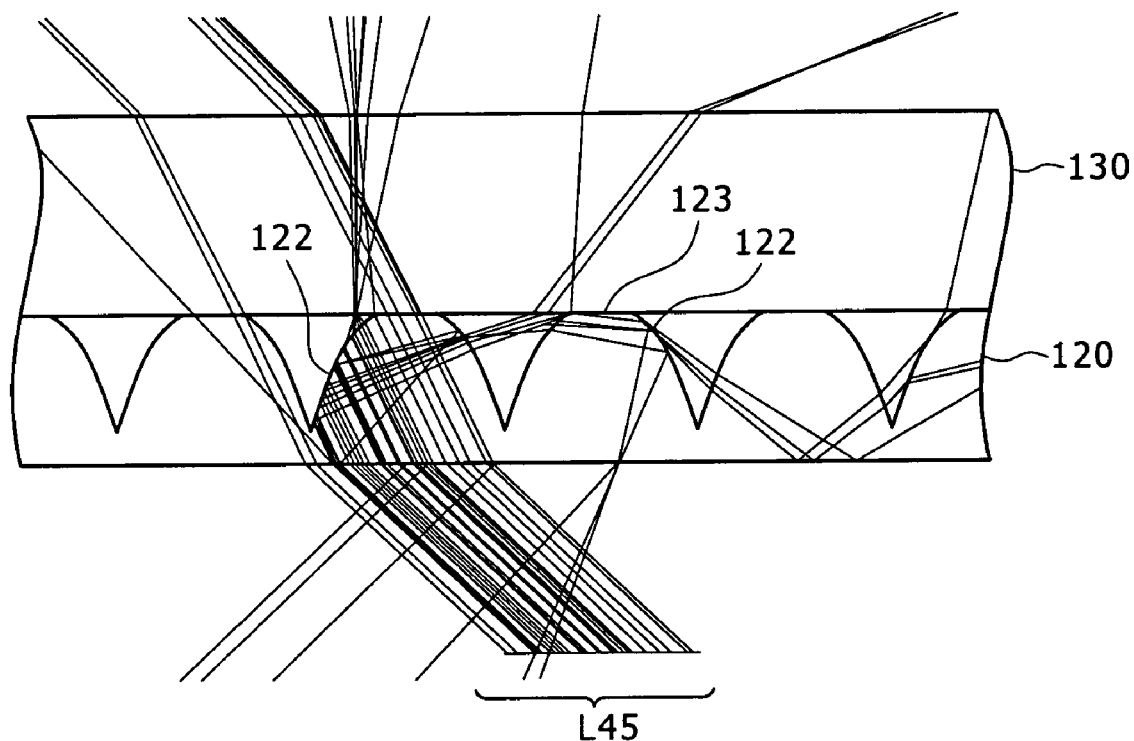
FIG. 12 is a schematic view showing part of FIG. 11 in an enlarged scale.

FIG. 7 and FIG. 8 which is an enlarged view of FIG. 7 illustrate a reflection state of light L10 incident at an angle of 10° to the lens array sheet 120. FIG. 9 and FIG. 10 which is an enlarged view of FIG. 9 illustrate a reflection state of light L20 incident at an angle of 20° to the lens array sheet 120. FIG. 11 and FIG. 12 which is an enlarged view of FIG. 11 illustrate a reflection state of light L45 incident at an angle of 45° to the lens array sheet 120. As can be seen from the figures mentioned, as the incident angle increases, the reflection state varies such that the light radiated from the upper face 132 of the light guide plate 130 increases.

Since the combination of the lens array sheet 120 and the light guide plate 130 functions as a diffusion plate in this manner, the brightness at bright portions immediately above the lamps can be moderated. Accordingly, even if the thickness from the reflective plate 110 to the light guide plate 130 is reduced from that in existing planar light source apparatus, a luminance distribution similar to that of existing planar light source apparatus can be obtained.

Figure 13:
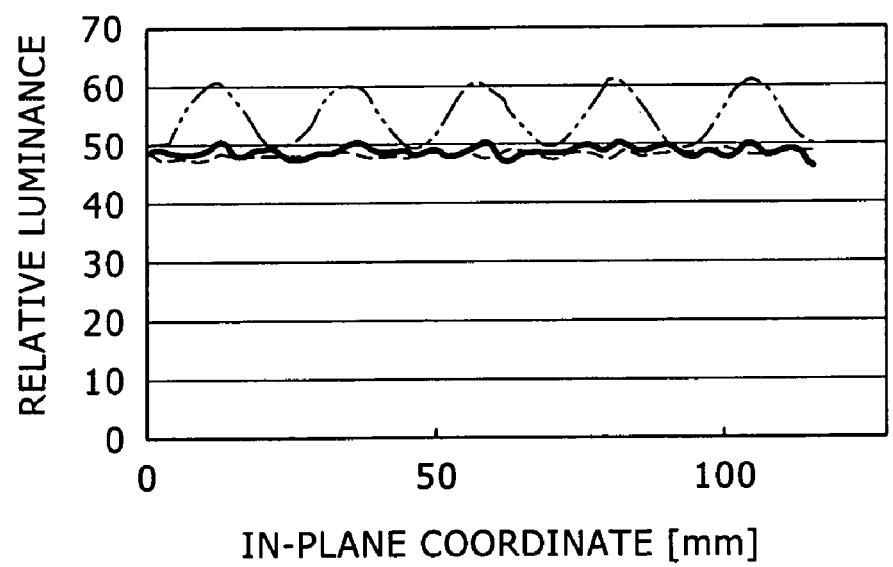
FIG. 13 is a characteristic diagram illustrating an example of a luminance distribution by the planar light source apparatus.
Figure 20:
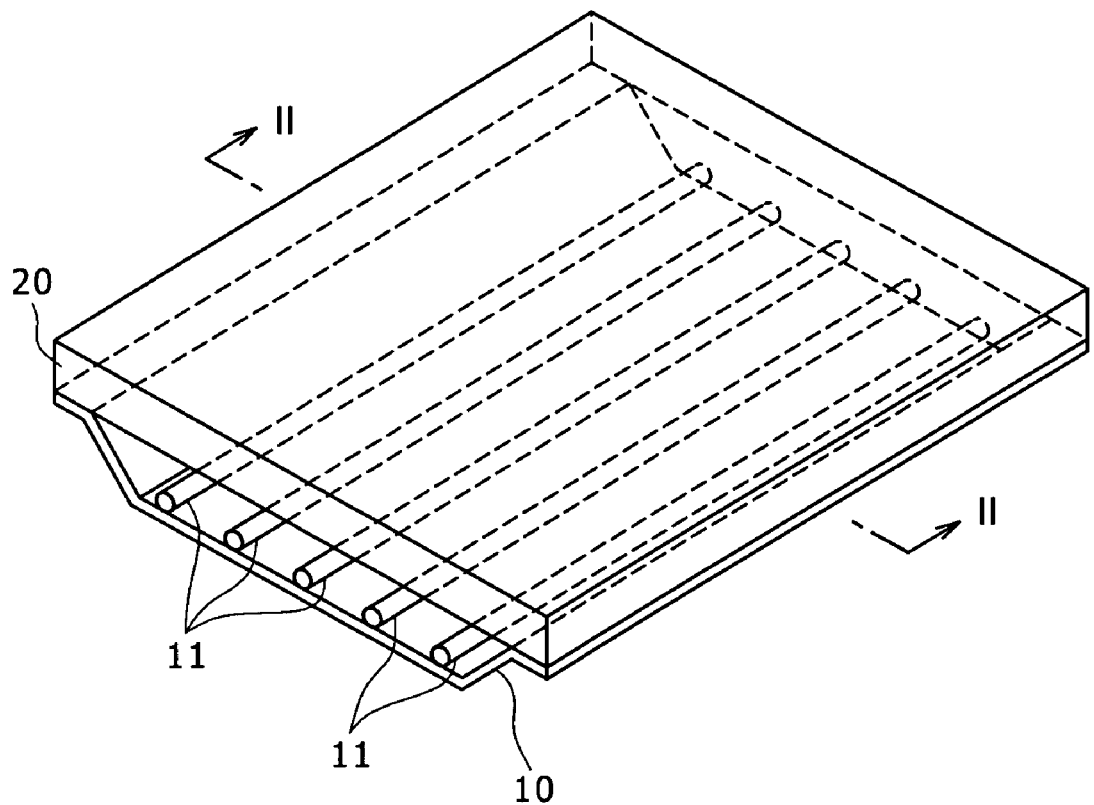
FIG. 20 is a perspective view showing an example of a configuration of a conventional direct type planar light source apparatus.
Figure 21:
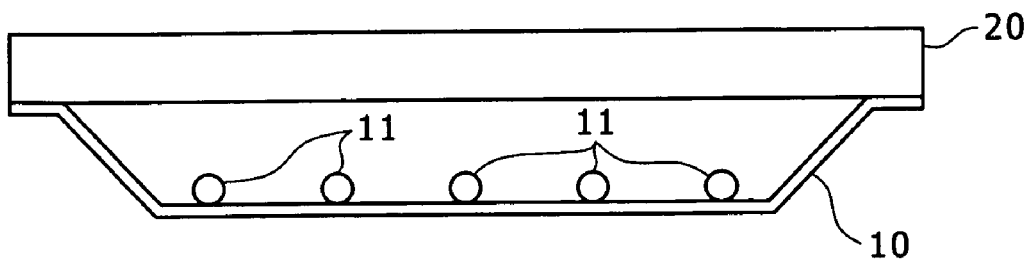
FIG. 21 is a sectional view taken along line II-II of FIG. 20.

FIG. 13 illustrates the distribution of the relative luminance of the planar light source apparatus 100 produced in the configuration according to the present embodiment in comparison with the distribution of the relative luminance of a planar light source apparatus of an existing configuration shown in FIG. 20. A curve indicated by a broken line in FIG. 13 represents the luminance distribution of the planar light source apparatus of the existing configuration. The luminance distribution of the existing configuration indicated by the broken line exhibits very small variation and is substantially uniform. If the planar light source apparatus of the existing configuration is formed with a reduced thickness while the configuration is maintained, then the luminance exhibits a great variation depending upon the position as seen from an imaginary line (alternate long and two short dashes line) in FIG. 13. Therefore, the planar light source apparatus of the existing configuration having a reduced thickness is not suitable for a backlight for a display panel.

Here, if the planar light source is formed with a reduced thickness similarly to that of the planar light source whose luminance is indicated by the imaginary line and the lens array sheet 120 and the light guide plate 130 having the configuration according to the present embodiment described above are incorporated, then a luminance distribution indicated by a solid line in FIG. 13 is obtained. The luminance distribution indicated by the solid line is substantially equivalent to the luminance distribution of the existing planar light source apparatus whose thickness is not reduced in such a manner as described above. Thus, the luminance distribution indicates a good characteristic suitable to a backlight for a display panel. Accordingly, even if the planar light source is reduced in thickness from that of the existing planar light source, a luminance distribution similar to that of the existing planer light source can be achieved.

Figure 14:
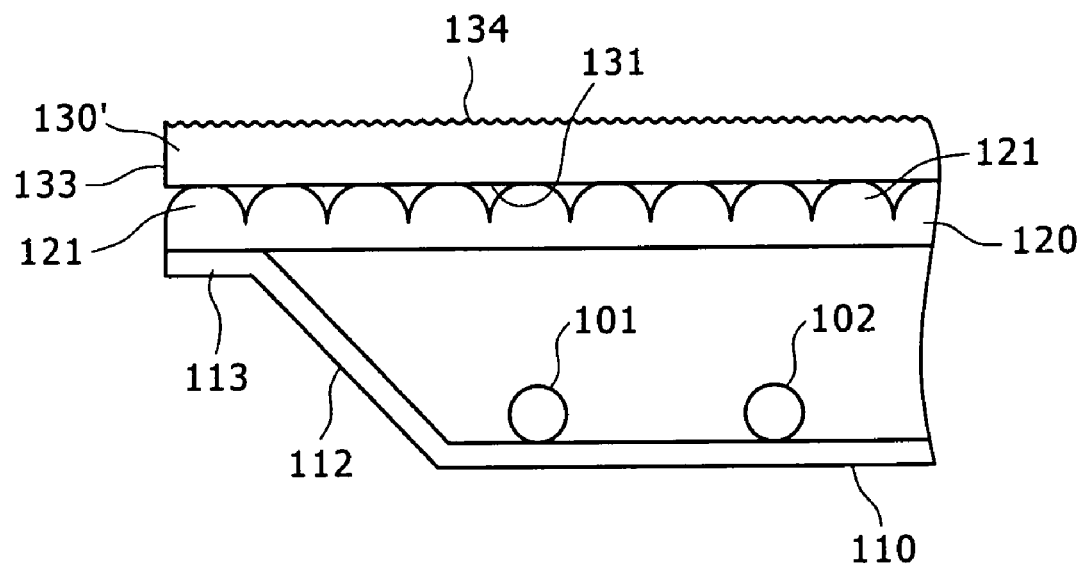
FIG. 14 is a partial sectional view of another planar light source apparatus to which the present invention is applied showing an example of a configuration wherein the surface of a light guide plate is worked.

It is to be noted that, while, in the embodiment described above, the light guide plate 130 is formed as a flattened transparent plate, it may otherwise be formed as a member having a light diffusing action or formed, for example, as a diffusing action portion 134 on the surface of a light guide plate 130' as seen in FIG. 14. The lower face 131 remains in the form of a flattened face. The diffusing action portion 134 may be formed, for example, by forming vary small concave and convex portions on the surface. Or, the light guide plate 130 itself may not have a diffusion function, but alternatively a separate resin sheet having a diffusion action may be adhered to the surface of the light guide plate 130.

Further, while, in the embodiment described above, the lens projections 121 on the lens array sheet 120 are disposed continuously without leaving a gap therebetween on the lens array sheet 120 as seen in FIG. 3, they may otherwise be disposed with some gap left therebetween. Further, some difference may be provided to such gaps depending upon the position.

Figure 15:
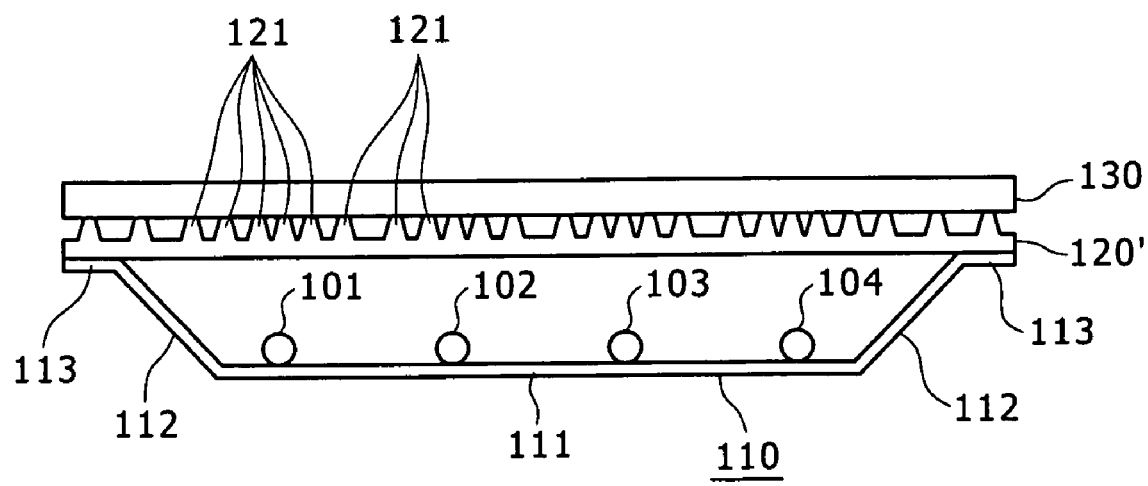
FIG. 15 is a sectional view of a further planar light source apparatus to which the present invention is applied showing an example of a configuration wherein lens projections are disposed non-uniformly.

FIG. 15 shows the configuration just mentioned in cross section. Referring to FIG. 15, in the lens array sheet 120' shown, the lens projections 121 are disposed continuously without a gap left therebetween at positions directly above lamps 101 to 104, but the lens projections 121 are disposed such that the arrangement distance therebetween increases as the distance from the position just above each lamp increases. By the arrangement of the lens projections 121, at the position just above each lamp, a diffusion action by the lens projections 121 acts strongly, but at a position displaced from the position just above each lamp, the diffusion action is weak. Thus, the lens projections 121 contribute much to uniformization of the luminance distribution.

Further, while, in the embodiment described above, a CCFL tube which emits light in a bar-like distribution is used as a light source, a light source of a different shape may be used alternatively. For example, even in the case of a bar-like light source, a fluorescent lamp curved in a U shape may be used. Or, a spot-like light source which emits light from a location similar to a point such as a light emitting diode (LED) may be used. The spot-like light source here is used in contrast with a bar-like light source but does not point to a point light source.

Where a spot-like light source such as a light emitting diode is adopted, preferably the shape and the arrangement state of the lens projections to be disposed on the lay array sheet are set so as to be suitable for the spot-like light source.

Figure 16:
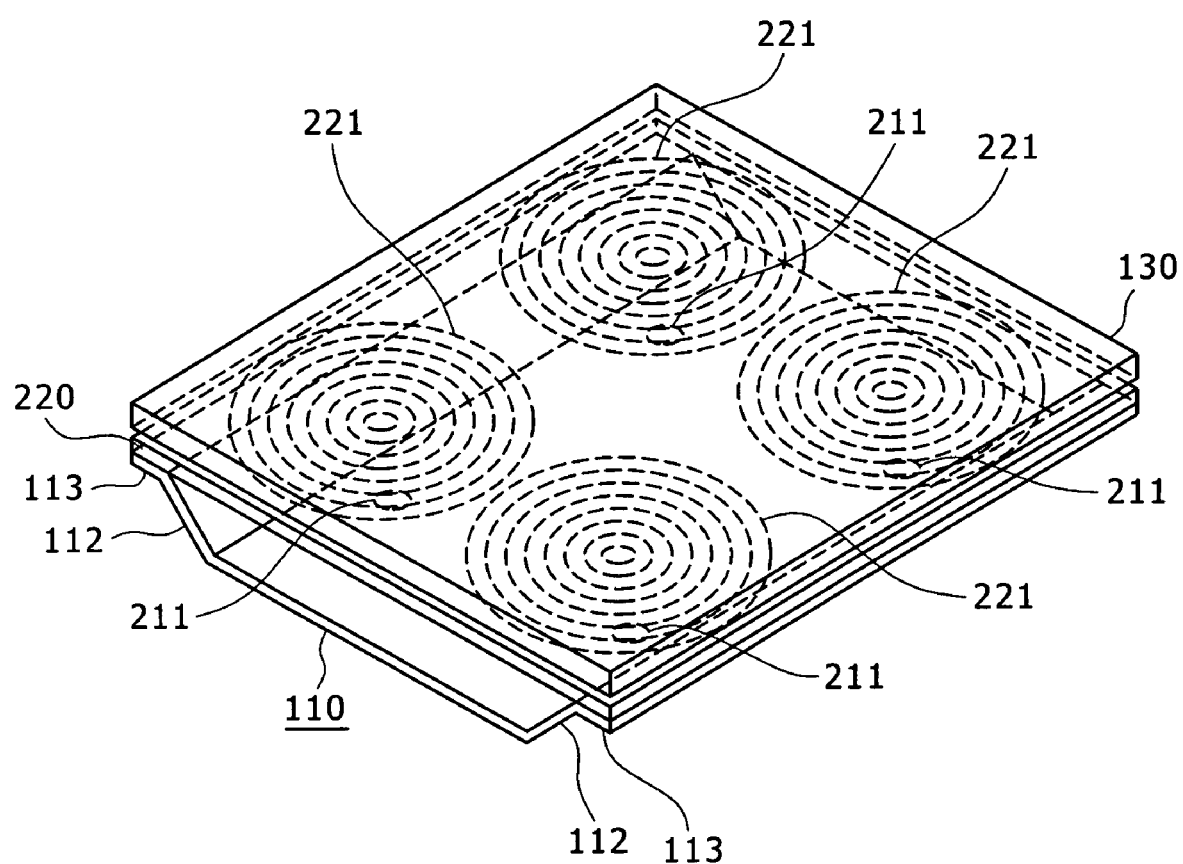
FIG. 16 is a perspective view of a still further planar light source apparatus to which the present invention is applied showing an example of a configuration wherein a point light source is used.
Figure 17:
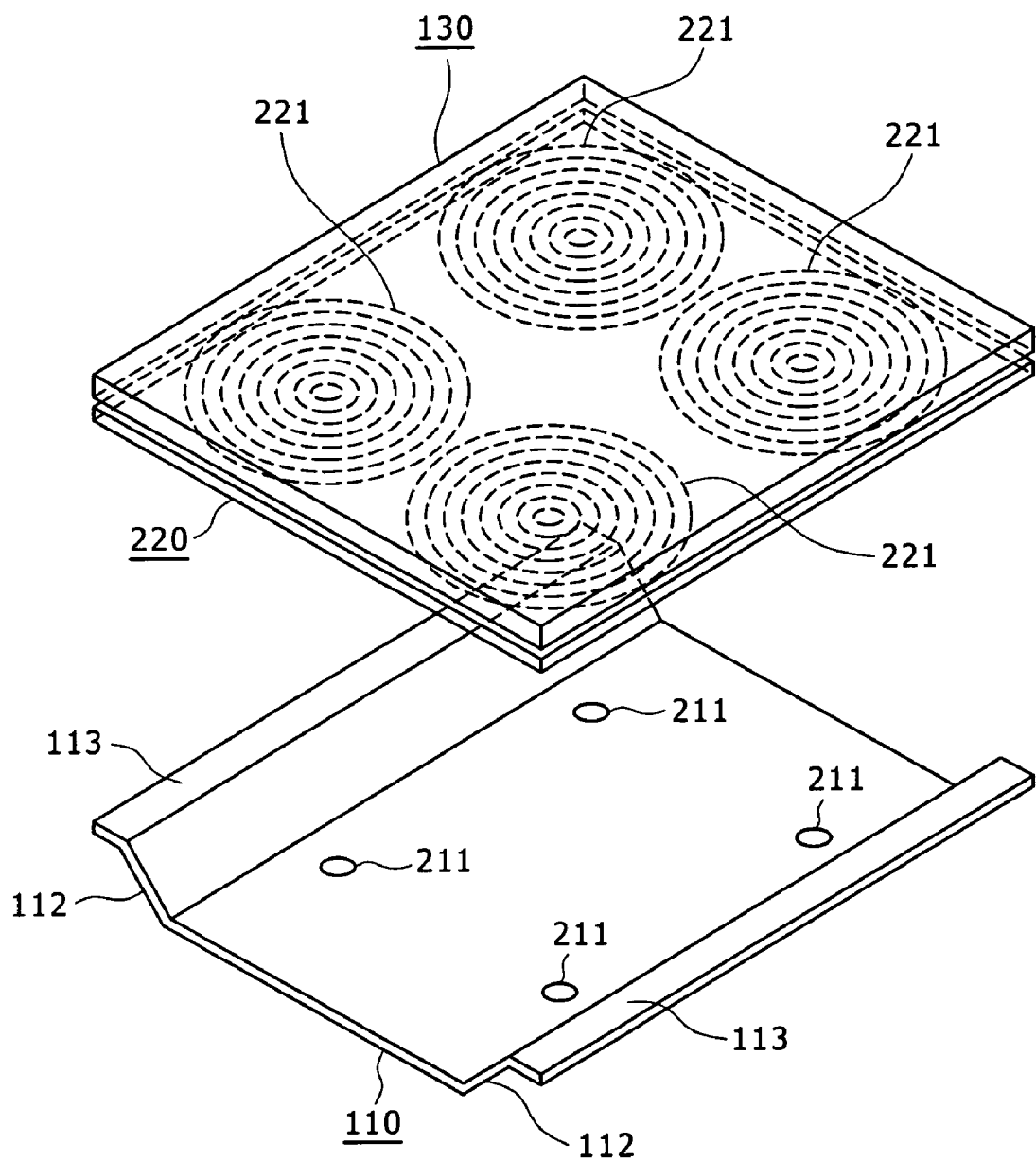
FIG. 17 is an exploded perspective view of the light source apparatus shown in FIG. 16.

FIGS. 16 and 17 show an example of a planar light source apparatus wherein a light emitting diode is used as a light source, and particularly FIG. 17 shows the apparatus of FIG. 16 in an exploded fashion. Referring to FIGS. 16 and 17, in the planar light source apparatus shown, four light sources 211 each formed from a light emitting diode are disposed at different locations on the reflective plate 110. A lens array sheet 220 is formed such that a plurality of continuous and circular lens projections 221 are disposed concentrically around the position just above each of the light sources 211. The lens projections 221 may have a cross section similar to that of the lens projections 121 of the lens array sheet 120 shown in FIG. 4, that is, a cross section having the curved face portions 122 and the flat face portion 123. The light guide plate 130 disposed on the lens array sheet 220 may have a configuration same as that of the light guide plate 130 described hereinabove.

Where the planar light source apparatus has the configuration described above with reference to FIGS. 16 and 17, strong diffusion of light occurs at a position proximate to the position just above each light source 211, and consequently, the luminance distribution of light emitted from the light guide plate 130 can be uniformized favorably. Therefore, reduction in thickness of a planar light source apparatus which uses the spot-like light source such as a light emitting diode can be anticipated. Also in the arrangement of FIG. 16, the distance of arrangement of the circular lens projections 221 may be provided and increased as the distance from each light source increases. Further, while, in the arrangement of FIG. 16, the lens projections 221 are not provided at positions spaced away from the light sources 211, the circular lens projections 221 may otherwise be disposed over the overall surface of the lens array sheet 220. However, where the lens projections 221 are disposed over the overall surface, the lens projections 221 at peripheral portions cannot have an annular shape.

Further, a plurality of lens projections disposed on the lens array sheet may have a conically projecting shape.

Figure 18:
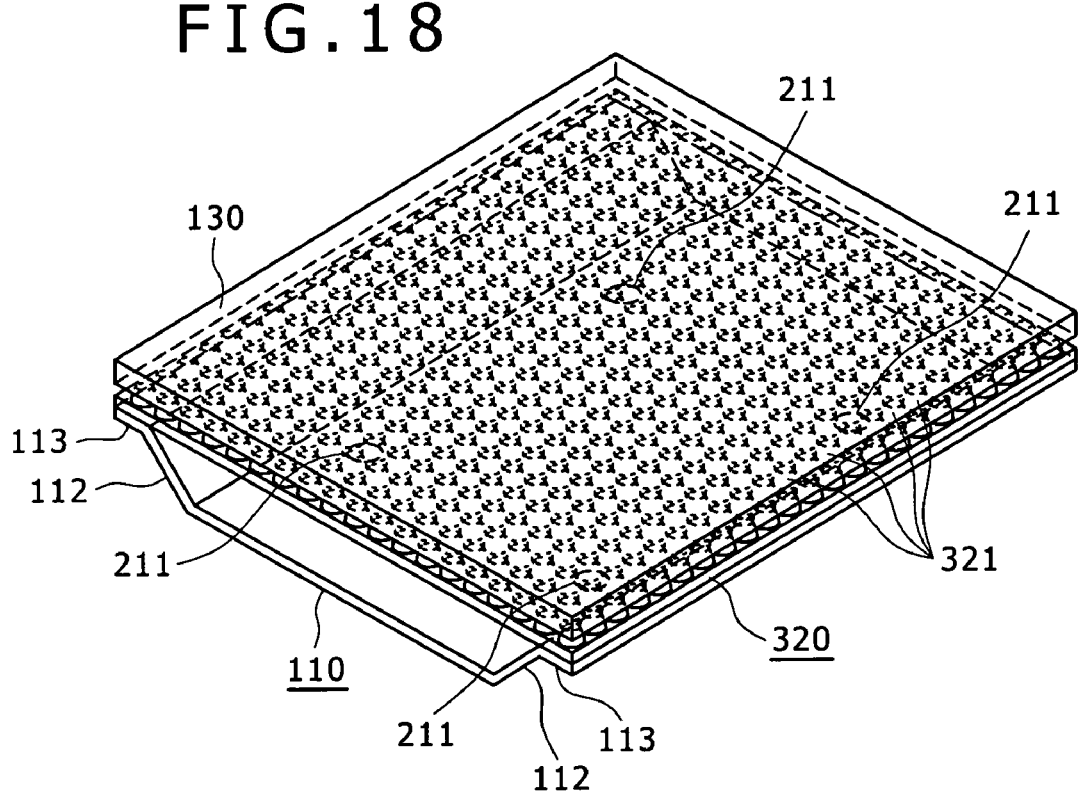
FIG. 18 is a perspective view of a yet further planar light source apparatus to which the present invention is applied showing an example of a configuration wherein a circular lens is used.

FIG. 18 shows an example of a configuration in this instance. Also in the example of FIG. 18, four light sources 211 each formed from a light emitting diode are disposed at different positions on the reflective plate 110. A lens array sheet 320 is shaped such that conical lens projections 321 are disposed continuously longitudinally and transversely in a matrix. The lens projections 321 may have a sectional shape same as that of the lens projections 121 of the lens array sheet 120 shown in FIG. 4, that is, a shape having the curved face portions 122 and the flat face portion 123. It is to be noted that, since the lens projections 321 have a conical shape, same cross sectional shapes are exhibited in whichever direction the section is taken, and the face corresponding to the curved face portions 122 has an annular shape and also the flat face portion 123 has a circular shape. The light guide plate 130 disposed on the lens array sheet 220 has a configuration same as that of the light guide plate 130 described hereinabove.

Also where the configuration described above with reference to FIG. 18 is adopted, incident light can be diffused efficiently by an action of the lens array sheet 320 and the light guide plate 130, and reduction in thickness of a planar light source apparatus can be anticipated.

It is to be noted that, also where the configuration shown in FIG. 18 wherein the lens projections 321 are disposed is adopted, the lens projections 321 may be disposed continuously without a gap left therebetween at positions just above the light sources 211 while, at positions displaced from the positions mentioned, the lens projections 321 are disposed in a spaced relationship by some distance from each other.

Figure 19:
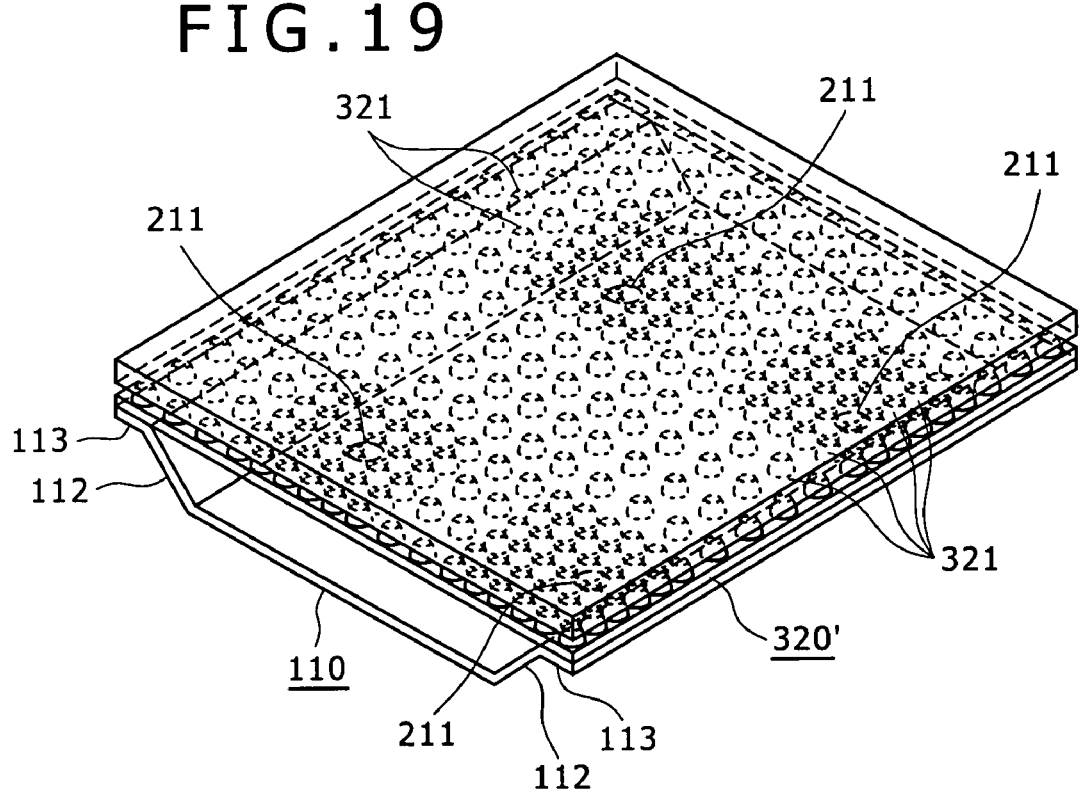
FIG. 19 is a perspective view of a yet further planar light source apparatus to which the present invention is applied showing another example of a configuration wherein a circular lens is used.

FIG. 19 shows an example of a configuration in this instance. Referring to FIG. 19, on a lens array sheet 320' in the planar light source apparatus shown, the lens projections 321 of a conical shape are disposed such that, at positions just above the light sources 211, the lens projections 321 are disposed continuously without leaving a gap therebetween. However, at positions displaced from the positions just above the light sources 211, the lens projections 321 are disposed in a spaced relationship from each other. By varying the arrangement distance of the lens projections 321 as seen in FIG. 19, the diffusion state of light can be further uniformized.

While preferred embodiments of the present invention have been described using specific terms, such description is for illustrative purpose only, and it is to be understood that changes and variations may be made without departing from the spirit or scope of the following claims.

What is claimed is:

1. A planar light source apparatus, comprising:
a light source configured to emit light in a spot-like pattern or a bar-like pattern;
a reflective plate configured to reflect the light from said light source;
a light guide plate disposed on the opposite side to said reflective plate with respect to said light source; and
a lens array sheet disposed between said light source and said light guide plate;
said lens array sheet having a plurality of convex-shaped lenses disposed in a predetermined state on a face thereof adjacent said light guide plate, in which each of said plurality of convex-shaped lenses has, at an apex thereof, a flat face portion which contacts with said light guide plate.

2. The planar light source apparatus according to claim 1, wherein each of said plurality of said convex-shaped lenses of said lens array sheet has a substantially parabolic shape on either side of the respective flat portion and a focal position in the proximity of the respective flat portion at which said lens array sheet contacts with said light guide plate.

3. The planar light source apparatus according to claim 1, wherein said light source is formed as a light source configured to emit light in a bar-like pattern.

4. The planar light source apparatus according to claim 1, wherein said light source is formed as a light source configured to emit light in a spot-like pattern.

5. The planar light source apparatus according to claim 1, wherein said convex-shaped lenses on said lens array sheet are disposed two-dimensionally in a predetermined spaced relationship from each other on said lens array sheet.

6. The planar light source apparatus according to claim 1, wherein said convex-shaped lenses on said lens array sheet are disposed such that the arrangement distance therebetween increases as the distance from the arranged position of said light source increases.

7. The planar light source apparatus according to claim 1, further comprising a light diffusing element provided on the surface of said light guide plate.

8. The planar light source apparatus according to claim 1, in which a width of each said flat portion lies in a range of approximately 0.005 to 0.02 millimeters.

9. A display apparatus, comprising:
a display panel; and
a planar light source section disposed on the rear face of said display panel;
said planar light source section including
a light source configured to emit light in a spot-like pattern or a bar-like pattern,
a reflective plate configured to reflect the light from said light source toward the rear race of said display panel,
a light guide plate disposed on the opposite side to said reflective plate with respect to said light source, and
a lens array sheet disposed between said light source and said light guide plate,
said lens array sheet having a plurality of convex-shaped lenses disposed in a predetermined state on a face thereof adjacent said light guide plate, in which each of said plurality of convex-shaped lenses has, at an apex thereof, a flat face portion which contacts with said light guide plate.

10. The display apparatus according to claim 9, in which a width of each said flat portion lies in a range of approximately 0.005 to 0.02 millimeters.

11. A planar illumination method for illuminating in a planar fashion, comprising the steps of:
introducing light from a light source, which emits light in a spot-like fashion or a planar fashion, to the rear face of a lens array sheet having a plurality of convex-shaped lenses disposed in a predetermined state on the surface thereof;
introducing the light coming out from the surface of said lens array sheet to a light guide plate; and
performing the planar illumination with the light coming out from the light guides plate,
in which each of said plurality of convex-shaped lenses has, at an apex thereof, a flat face portion which contacts with said light guide plate.

12. The method according to claim 11, in which a width of each said flat portion lies in a range of approximately 0.005 to 0.02 millimeters.

* * * * *